United States Patent [19]
Balachandran et al.

[11] Patent Number: 6,014,548
[45] Date of Patent: Jan. 11, 2000

[54] METHOD AND APPARATUS FOR FACILITATING DETECTION OF A SYNCHRONIZATION SIGNAL GENERATED BY A SATELLITE COMMUNICATION NETWORK

[75] Inventors: Kumar Balachandran; Y-P Eric Wang, both of Cary, N.C.

[73] Assignee: Ericsson Inc., Research Triangle Park, N.C.

[21] Appl. No.: 09/054,839

[22] Filed: Apr. 3, 1998

[51] Int. Cl.$^7$ ..................................................... H04B 7/19
[52] U.S. Cl. ..................... 455/13.2; 455/426; 455/502; 455/552; 370/350; 375/356
[58] Field of Search .................... 455/426, 427, 455/436, 502, 522, 12.1, 38.3, 343, 13.2; 370/320, 324, 350, 507; 375/356

[56] References Cited

U.S. PATENT DOCUMENTS 5,608,722  3/1997  Miller ........................................ 370/320

5,818,814  10/1998  Testani et al. ............................ 455/502

FOREIGN PATENT DOCUMENTS

WO 98/09455   3/1998  WIPO .
PCT/US99/
   07281   7/1999  WIPO .

*Primary Examiner*—Lee Nguyen
*Attorney, Agent, or Firm*—Jenkens & Gilchrist, P.C.

[57] ABSTRACT

A method and apparatus for facilitating detection of a synchronization signal generated by a satellite cellular network by a multi-mode radiotelephone. Once detected, the radiotelephone is synchronized to the synchronization signal. The radiotelephone is also operable pursuant to a terrestrial cellular communication network. Signals generated by the terrestrial cellular communication network inform the radiotelephone of the carrier upon which the synchronization signal is transmitted. Tuning of the radiotelephone to such carrier facilitates quick detection, and subsequent synchronization to, the synchronization signal.

20 Claims, 3 Drawing Sheets

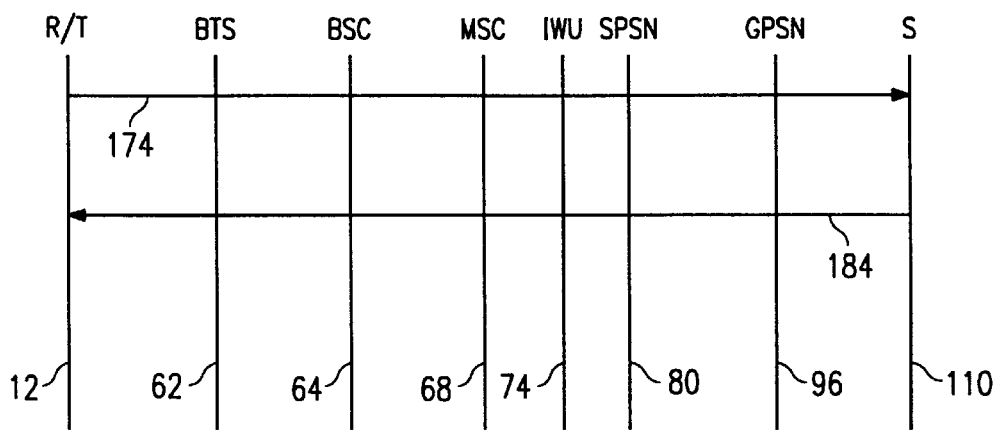
FIG. 2
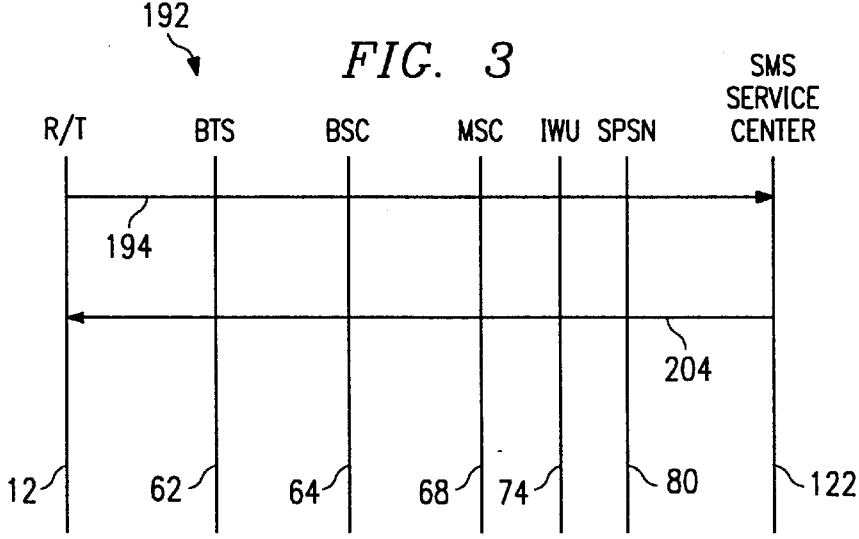
FIG. 3
```
274 ─┐  DETECT DOWNLINK CONTROL SIGNALS
        GENERATED BY TERRESTRIAL CELLULAR SYSTEM        ┌─ 272
                        ↓
276 ─┐  EXTRACT SATELLITE-NETWORK                      FIG. 5
        SYNCHRONIZATION SIGNAL-LOCATION INFORMATION
                        ↓
278 ─┐  DETECT THE SATELLITE SYNCHRONIZATION SIGNAL
                        ↓
288 ─┐  SYNCHRONIZE RADIOTELEPHONE
```
FIG. 5

METHOD AND APPARATUS FOR FACILITATING DETECTION OF A SYNCHRONIZATION SIGNAL GENERATED BY A SATELLITE COMMUNICATION NETWORK

The present invention relates generally to the synchronization of a radiotelephone, operable to communicate both with a satellite communication network and with a terrestrial cellular communication network, to a synchronization signal generated by the satellite communication network. More particularly, the present invention relates to a method, and an associated apparatus, for facilitating detection at the radiotelephone of the synchronization signal. Detection of the synchronization signal is facilitated, when the radiotelephone is positioned in an area encompassed by the terrestrial cellular communication network, by making use of the ability of the radiotelephone to receive signals generated by the terrestrial cellular communication network. Signals generated by the terrestrial cellular communication network inform the radiotelephone of the carrier upon which the synchronization signal is transmitted. Tuning of the radiotelephone to such carrier facilitates quick detection, and subsequent synchronization to, the synchronization signal. Detection of the synchronization signal, and the synchronization of the radiotelephone to the synchronization signal, is performed quickly by averaging energy levels over short periods of time, if possible, thereby to synchronize the radiotelephone to the synchronization signal within a reduced time period.

Because the radiotelephone is informed of the carrier upon which the synchronization signal is transmitted, the need otherwise to sample the signal energy levels on a plurality of different carriers, in the event that the synchronization signal is of a low signal-to-noise ratio is obviated. And, because synchronization of the radiotelephone to the synchronization signal is permitted to be carried out in a reduced amount of time if the signal-to-noise ratio of the synchronization signal is at least as high as a selected level, processing time and processing power consumption required to synchronize the radiotelephone to the synchronization signal is correspondingly also reduced.

BACKGROUND OF THE INVENTION

A radio communication system is a type of communication system in which a transmitter and receiver are connected by a communication channel defined upon a portion of the electromagnetic frequency spectrum. Fixed or hard-wired connections are not required to form a communication channel to interconnect the transmitter and receiver. Communications can be effectuated between the transmitter and receiver in a radio communication system even when the use of a fixed or hard-wired connection would be inconvenient or impractical.

Technological advancements in communication technologies have permitted the widespread utilization of multiple-access, cellular communication systems. Installation of the network infrastructure of conventional, terrestrial cellular communication systems permits multiple numbers of users to communicate by way of the terrestrial cellular system when positioned in an area encompassed by such a system. A terrestrial cellular system is constructed, typically, pursuant to a selected standard specification. To be operable to communicate by way of a terrestrial cellular system, a radiotelephone positioned within the geographical area encompassed by the system must be constructed to permit its operation in such system.

Additional technological advancements have permitted the workability of multiple-access satellite communication systems. And, various proposals have been set forth for satellite communication systems. A satellite communication system is generally able to provide for wider-area geographic coverage than that of a conventional terrestrial cellular system. And, compatibility problems resulting from positioning of a radiotelephone operable in only one terrestrial cellular communication system in a geographical area encompassed by a different type of terrestrial system is therefore less likely to occur. Various ones of the proposed satellite communication systems, for instance, permit almost worldwide coverage.

At least one type of satellite communication system proposes to make use of geostationary satellites which shall provide communication coverage over fixed local areas. Another proposal for a satellite communication system shall make use of low-earth, orbiting systems having numerous satellites placed in low-earth orbits and providing coverage over large areas of, or even entirely encompassed, the earth. Proposed satellite communication systems include the Iridium system utilizing sixty-six low-earth orbiting satellites, the intermediate circular orbit (ICO-P21) system having twelve satellites positioned in a medium-earth orbit, and the ASEAN cellular satellite system (ACeS) using a geostationary or a geosynchronously-positioned satellite to provide local communication coverage over a selected portion of the earth.

Dual-or multi-mode radiotelephones have been proposed which would permit communication alternately pursuant to a satellite communication system and pursuant to a terrestrial cellular communication system. Such a phone would permit user-selection of the communication system through which communications are to be effectuated.

Generally, the proposed satellite communication systems shall provide the ability to communicate both voice and data. A user having a radiotelephone, also referred to herein as a "user terminal", operable to communicate by way of the satellite communication system shall be able to communicate therethrough when positioned at almost any location.

In order to effectuate communications between the user terminal and a satellite network, the radiotelephone must be synchronized to the satellite communication network. A beacon signal transmitted by satellite-positioned transceivers forms a synchronization signal to which a radiotelephone can be synchronized. In the afore-mentioned ACeS system, an HPS (high power synchronization) signal is generated. The HPS signal is formed of four uniquely-spaced, high power bursts. Such bursts are repeated during each multi-frame of data according to the standard specification of the ACeS system. Three of the high power bursts of the HPS signal contain broadcast information. And, a fourth of the high power bursts contains a maximal-length, pseudo-random sequence.

In the ACeS satellite communications system, signals are directed in selected ones of one hundred forty-four different beams. Each of such beams is assigned to a unique HPS frequency. A plurality of HPS carriers are allocated in the ACeS satellite communication system, appropriately distributed amongst the one hundred forty-four beams in a manner which minimizes interference between signals directed to adjacent geographical areas. And, in some jurisdictions, the frequencies allocated for transmission of the signals vary from those frequencies allocated in other jurisdictions. The radiotelephone might be positioned in an area in which the HPS carrier allocation is not known. As a result, a search must be made over an entire frequency band. The HPS carriers may, for example, number about thirty.

The HPS signal, when received at the radiotelephone, may be of a low signal energy level, particularly when the radiotelephone is not positioned in a manner to facilitate its detection of the HPS signal. For instance, the radiotelephone might be positioned in a pocket or purse of a user.

The HPS signal, for instance, may be received at a signal-to-noise ratio (SNR) on the order of −10 dB. At such a low SNR, detection of, and synchronization to, the HPS signal within a desirably small time period is difficult.

A synchronization method exists which facilitates the synchronization of a radiotelephone when the carrier upon which the HPS signal is transmitted is known. Synchronization may, however, require as long as three seconds per carrier. While such existing manner by which to synchronize the user terminal to the HPS signal is efficient in terms of power consumption, the amount of time required to synchronize the radiotelephone to the HPS signal in the existing art is sometimes too lengthy. The amount of time required to synchronize a radiotelephone might require up to ninety seconds of processing time prior to completion of the acquisition.

As the amount of processing time required to detect and synchronize the radiotelephone to the HPS signal is directly related to the processing power, a reduction in the amount of time required to detect and synchronize the radiotelephone thereto would also provide additional power savings, thus increasing standby time.

A manner by which to detect, and thereafter synchronize a radiotelephone to a synchronization signal in a reduced amount of time would be advantageous.

It is in light of this background information related to radio communication systems that the significant improvements of the present invention have evolved.

SUMMARY OF THE INVENTION

The present invention, accordingly, advantageously provides a method, and an associated apparatus, for facilitating detection at a multi-mode radiotelephone of a synchronization signal. Use is made of the ability of the radiotelephone to communicate both pursuant to a satellite communication system and pursuant to a terrestrial cellular communication system.

Signals generated by the terrestrial cellular communication system inform the radiotelephone to what satellite HPS (high power synchronization) signal to which the receiver circuitry of the radiotelephone should be tuned. Responsive thereto, the radiotelephone is tuned to the HPS signal to receive the synchronization signal. Signal-energy averaging procedures used to synchronize the radiotelephone to the synchronization signal are performed during a reduced time period, thereby to complete synchronization procedures more quickly.

In one aspect of the present invention, the terrestrial cellular communication system is operable to provide SMS (short message service) messages. The information provided to the radiotelephone as to which carrier to tune to receive the satellite-system, synchronization signal is provided to the radiotelephone in the form of SMS messages. In another aspect of the present invention, the radiotelephone receives the information by an Internet service hosted by an operator of the satellite communication system.

In another aspect of the present invention, synchronization to the synchronization signal, once the radiotelephone is tuned to the selected carrier, is performed by averaging the net energy of portions of a burst of the HPS signal. If the signal-to-noise ratio of the HPS signal is greater than a selected threshold, the averaging time during which the net energy stored in the bins is reduced, thereby further reducing the amount of time, and power consumption required for processing, to synchronize the radiotelephone to the synchronization signal.

In these and other aspects, therefore, apparatus, and an associated method, is provided which facilitates the detection of a synchronization signal generated by a satellite communication network and received by a multi-mode radio transceiver. The multi-mode radio transceiver has receiver circuitry and transmitter circuitry permitting communication by way of the radio transceiver at least alternately with a terrestrial cellular communication network and with the satellite communication network. The synchronization signal synchronizes the radio transceiver with the satellite network. A terrestrial cellular signal detector is coupled to the receiver circuitry. The terrestrial cellular signal detector detects downlink control signals generated by the terrestrial cellular network. An information extractor is coupled to the receiver circuitry and is operable responsive to detection of the downlink control signals. The information extractor extracts satellite-network, synchronization signal-location information from downlink informational signals generated by the terrestrial cellular network. A satellite synchronization signal detector is coupled to the receiver circuitry and is operable responsive to the satellite-network, synchronization signal-location information extracted by the information extractor. The satellite synchronization signal detector detects the satellite synchronization signal.

A more complete appreciation of the present invention and the scope thereof can be obtained from the accompanying drawings which are briefly summarized below, the following detailed description of the presently-preferred embodiments of the invention, and the appended claims.

BRIEF DESCRIPTION OF THE DRAWINGS

FIG. 2 illustrates a sequence diagram illustrating the sequencing of signals during operation of an embodiment of the present invention.

FIG. 3 illustrates a sequence diagram, similar to that shown in FIG. 2, but illustrative of the signal sequencing during operation of another embodiment of the present invention.

FIG. 5 illustrates a logical flow diagram listing the method steps of an embodiment of the present invention.

DETAILED DESCRIPTION

Figure 1:
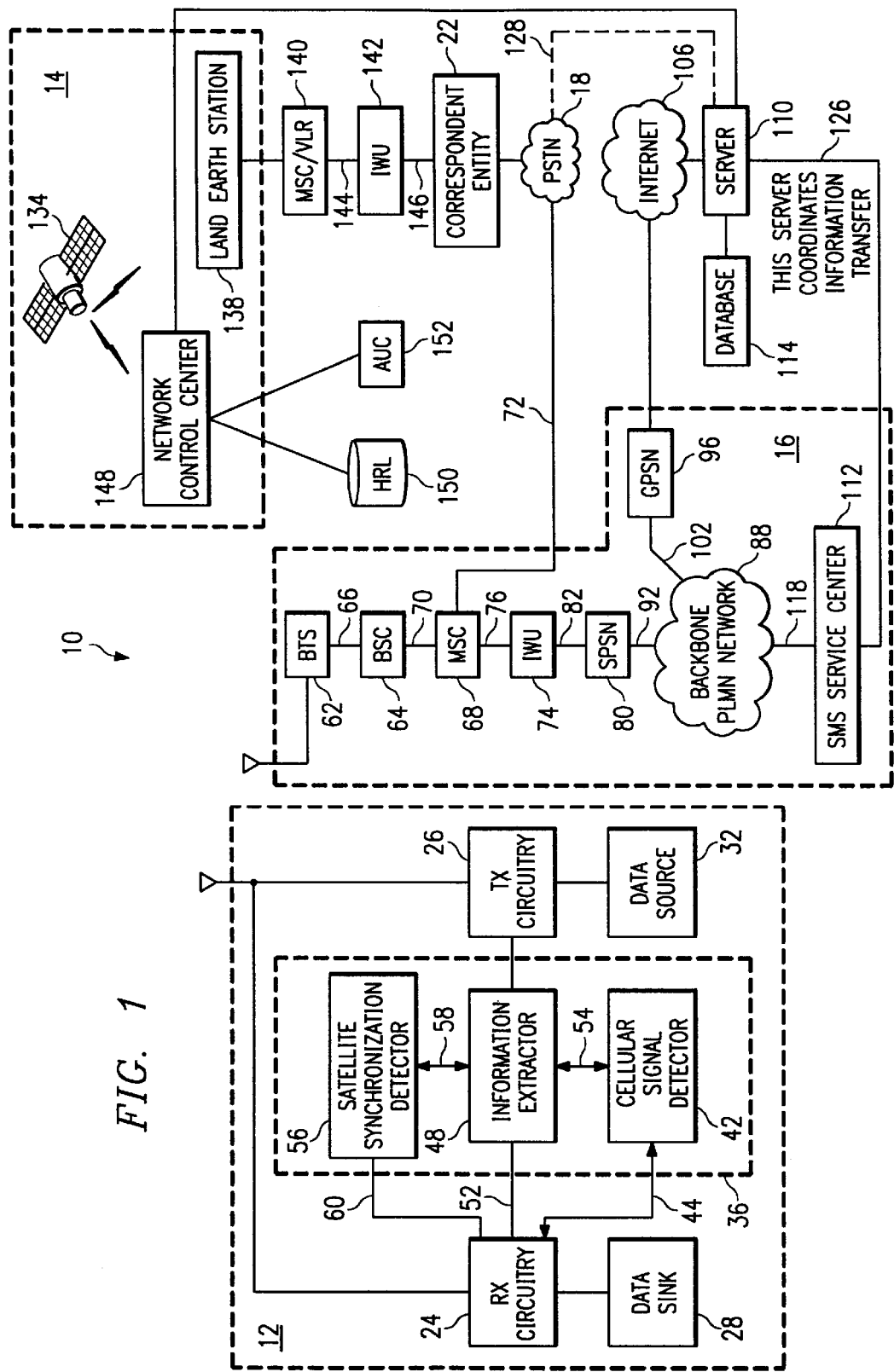
FIG. 1 illustrates a functional block diagram of a multi-mode radiotelephone in which an embodiment of the present invention is operable, positioned to communicate by way of a satellite communication system and by way of a terrestrial cellular communication system.

Referring first to FIG. 1, a multi-network communication system, shown generally at 10, permits wireless communication between a radiotelephone 12 and a satellite communication network 14 or a terrestrial cellular communication network 16. Both the satellite communication network 14 and the terrestrial cellular communication network 16 are coupled to a PSTN (public-switched, telephonic network)

18. The PSTN 18 is, in turn, coupled to a correspondent entity 22 to which the radiotelephone 12 can communicate. The radiotelephone 12 communicates with the correspondent entity 22 by way of a selected one of the satellite communication network 14 and the terrestrial cellular communication network 16.

The radiotelephone 12 includes receiver circuitry 24 and transmitter circuitry 26. Although not separately illustrated, the receiver circuitry includes, inter alia, down-converting, decoding, equalizing, and demodulating circuits. And, the receiver circuitry 24 is coupled to a data sink 28. Also while not separately illustrated, the transmitter circuitry 26 includes, inter alia, modulator, encoding, and upconverting circuitry. And, the transmitter circuitry 26 is coupled to a data source 32.

The radiotelephone 12 further includes a controller 36 which controls operation of the receiver and transmitter circuitry 24 and 26, respectively. The controller 36 is operable to perform conventional control functions which permit the radiotelephone 12 to transmit and to receive communication signal bursts. The functional elements of an embodiment of the present invention are here shown also to form a portion of the controller 36.

Namely, the controller 36 is shown to include a cellular signal detector 42 coupled by way of the line 44 to the receiver circuitry 24, an information extractor 48 coupled to the receiver circuitry by way of the line 52 and to the cellular signal detector 42. A satellite synchronization signal detector 56 further forms a portion of the controller 36, here shown to be coupled to the information extractor 48 by way of the line 58 and to the receiver circuitry by way of the line 60.

The portion of the terrestrial cellular communication network 16 illustrated in the Figure includes a BTS (base transceiver station) 62 capable of transceiving communication signals with the radiotelephone 12. The BTS 62 is coupled to a BSC (base station controller) 64 by way of the line 66. While not separately shown, the BSC 64 is typically also coupled to a plurality of other BTSs 62 and is operable to control certain of the functions of the BTSs. The BSC 64 is, in turn, coupled to a MSC (mobile switching center) 68, here by way of the line 70. The MSC is coupled to the PSTN 18 by way of the line 72. Communication between the radiotelephone 12 and the correspondent entity 22 is permitted therethrough.

The system 16 is further shown to include an IWU (interworking unit) 74 coupled to the MSC 68 by way of the lines 76. And, the IWU 74 is coupled to a SPSN (servicing packet service node) 80 coupled to the MSC 68 by way of the lines 82 and to a backbone PLMN (public-land mobile network) network 88 by way of the lines 92. The backbone PLMN network is further coupled to a GPSN (gateway packet service node) 96 by way of the lines 102.

The GPSN is coupled to an Internet 106. A satellite service provider station formed of a server 110 is further coupled to the Internet. The server 110 is coupled to a database 114.

The backbone PLMN network 88 is further coupled by way of the lines 118 to an SMS (short message service) service center 122. The SMS service center 122, in turn, is coupled to the server 110 by way of the lines 126.

The server 110 is further coupled directly to the PSTN by a wireline connection, here indicated by the lines 128.

The satellite communication network is formed of a plurality of satellite-based transceivers 134, of which one is illustrated in the Figure. A land earth station 138 also forms a portion of the system 14. The land earth station 138 is coupled to an MSC/VLR (mobile switching center/visited location register) 140 which, in turn, is coupled to an IWU (interworking unit) 142 by way of the lines 144. And, the IWU 142 is coupled, by way of the lines 146, to the correspondent entity 22.

The satellite communication network further includes network control centers, of which the network control center 148 is exemplary, form ground-based stations through which communication signals can be transmitted, and retransmitted between the satellite-based transceivers 134.

An HLR (home location register) 150 and AUC (authentication center) 152 are coupled to the network control center 148. The HLR and AUC 150 and 152 are operable in conventional fashion for registration and authentication purposes.

Operation of an embodiment of the present invention facilitates detection of a synchronization signal generated, and transmitted pursuant to operation of the satellite communication network 14. As mentioned previously, when received at the radiotelephone 12, such a synchronization signal may be of a relatively low SNR (signal-to-noise ratio). Operation of an embodiment of the present invention permits synchronization of the radiotelephone more quickly to the synchronization signal. Processing time, and hence, processing power required to synchronize the radiotelephone to the synchronization signal, is correspondingly also reduced.

To facilitate detection of the satellite-system, synchronization signal, advantage is taken of the ability of the radiotelephone 12 also to communicate pursuant to the terrestrial cellular communication network 16. In particular, signals generated by the terrestrial cellular communication network 16 indicate to the radiotelephone the carrier to which the receiver circuitry 24 thereof should be tuned to receive the synchronization signal generated by the satellite communication network 14.

In one embodiment, a request for the carrier information is generated at the radiotelephone 12 and transmitted to the BTS 62 of the communication network 16. The request is routed through the BSC 64, the MSC 68, the IWU 74, the SPSN 80, over the PLMN backbone network 88, and to the SMS service center 122. The SMS service center 122, in turn, queries the server 110 for the carrier frequency at which the receiver circuitry 24 should be tuned, depending upon the geographic positioning of the radiotelephone, to receive the synchronization signal. An indication of the geographic of the positioning of the radiotelephone 12 is provided by the BTS 62 which detects the request of the radiotelephone.

A database record is accessed by the server 110, and an indication of the accessed record is provided to the SMS service center 122. An SMS message is generated and routed back to the radiotelephone 12, to be received by the receiver circuitry 24.

The cellular signal detector detects the presence of downlink control signals generated by the terrestrial cellular communication network 16,, thereby providing to the radiotelephone 12 an indication that the radiotelephone is positioned in an area encompassed by the terrestrial cellular communication network. Once the cellular signal detector detects the downlink control signals, the transmitter circuitry 26 is caused to transmit a request for information of the carrier frequency to which the receiver circuitry 24 should be tuned to receive the synchronization signals generated by the satellite communication network.

Once the SMS message is routed back to the radiotelephone 12, the information extractor 48 extracts the information therefrom. Then, the receiver circuitry is caused to tune to the indicated carrier, and the satellite synchronization detector 56 detects the synchronization signal and synchronizes the radiotelephone 12 thereto.

In one embodiment of the present invention, the satellite synchronization detector is further operable to acquire, i.e., synchronize the radiotelephone to, the synchronization signal. A two step procedure is involved. First, a coarse acquisition step is performed. The coarse acquisition step is referred to as the power profile method. In the coarse acquisition step, the net energy during a section of a HPS signal burst is averaged and stored in bins. A rough synchronization is chosen corresponding to a bin which yields a maximum accumulated energy level. The coarse synchronization may be further refined by synchronizing to the HPS signal on a finer time scale, such as by correlation with a pseudo-random sequence. In a signal of a low SNR, when received at the radiotelephone, the total averaging, corresponding to the coarse synchronization, must be performed a relatively lengthy period of time, such as three seconds. If the SNR of the synchronization signal received at the radiotelephone 12 is of a better SNR, the averaging time required for the coarse acquisition step can be reduced.

A second step of the acquisition procedure, the fine synchronization step, is limited to the carrier that yields the highest energy accumulation during coarse synchronization. The time period required for this second step when the receive signal is of a low SNR typically lasts for a period of about two seconds.

By assuming that the SNR is of the order of 0 dB, the coarse acquisition step can be carried out in a reduced time period, such as 0.5 seconds (approximately the length of a multi-frame defined in the ASEAN system). The satellite synchronization detector, utilizing a fast acquisition procedure, takes a maximum of fifteen seconds for coarse synchronization. Thereafter, fine synchronization is carried out if the maximum accumulated energy value is over a selected threshold level. Otherwise, conventional, slow acquisition procedures are instead performed.

Thereby, the synchronization signal generated by the satellite communication system 14 is more quickly effectuated more quickly than conventionally and with less processing power consumption.

In another embodiment of the present invention, the server 110 provides indications of the carrier frequency upon which the synchronization signals are generated by way of the Internet 106 rather than by way of the SMS service center 122. Requests for such information are analogously also routed to the server 110 by way of the Internet 106. Routing through the terrestrial cellular communication system 16 is otherwise similar to that described previously. And, in another embodiment of the present invention, circuit-switched connections can be formed with the server 110 by way of the lines 128, and the information can be provided to the radiotelephone 12 by way of a circuit-switched connection.

FIG. 2 illustrates a sequence diagram, shown generally at 172, illustrating the routing of a request signal generated by the radiotelephone 12 to the satellite service provider station 110 requesting information related to the carrier upon which the satellite-system synchronization signal is generated. As illustrated, the request signal is routed, indicated by the path of the line 174 by the radiotelephone 12 to the BTS 62 then the BSC 64, the MSC 68, the IWU 74, the SPSN 80, through the backbone PLMN network 88, the GPSN 96, to the server 110.

FIG. 2 further illustrates the return signal generated by the satellite service provider station 110 indicated by the line 184 from the server 110 to the GPSN 96, the SPSN 80, the IWU 74, the MSC 68, the BSC 64, the BTS 62, and then to the radiotelephone 12.

FIG. 3 illustrates a sequence diagram, shown generally at 192, of another embodiment of the present invention in which SMS signals are utilized to provide the information related to the carrier upon which the satellite-system synchronization signals are transmitted. The line 194 represents the routing of the request for the information by the radiotelephone. Here again, the request is routed by way of the BTS 62 to the BSC 64, then the MSC 68, the IWU 74, the SPSN 80, through the backbone PLMN network 88, and to the SMS service center 122.

The routing by which the information is returned to the radiotelephone 12 is further illustrated in the diagram 192, here represented by the line 204. The information obtained by the SMS service center 122 is routed through the SPSN 80, the IWU 74, the MSC 68, the BSC 64, the BTS 62, and to the radiotelephone 12.

Figure 4:
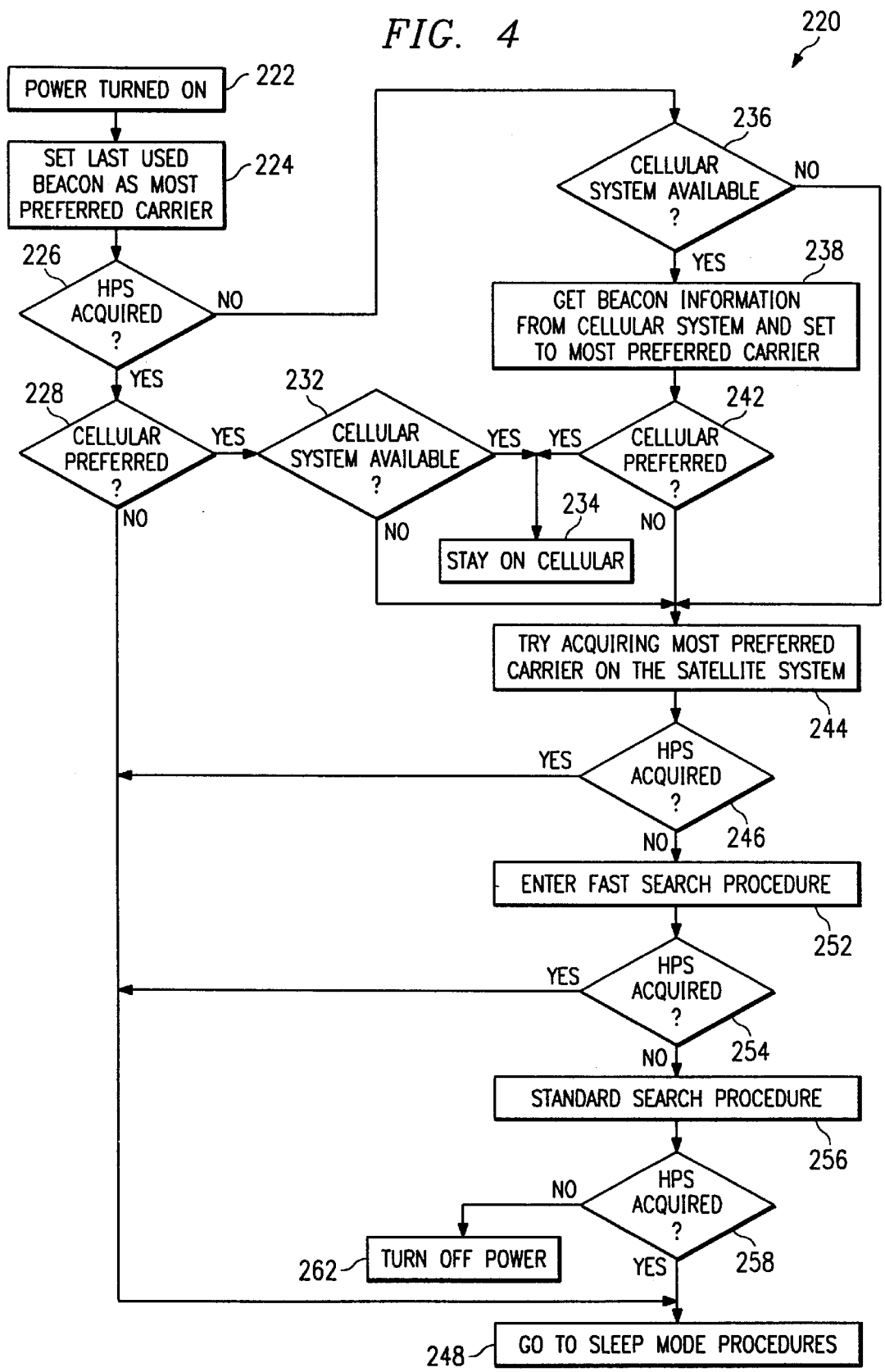
FIG. 4 illustrates a method flow diagram illustrating the method of operation of an embodiment of the present invention.

FIG. 4 illustrates a method, shown generally at 220, illustrating operation of an embodiment of the present invention to detect the satellite-system synchronization signal and to synchronize the radiotelephone thereto. Portions of the method 220 are carried out by the execution of algorithms by the controller 36 in the exemplary embodiment of the present invention.

First, and as indicated by the block 222, power to the radiotelephone 12 is turned-on. Then, and as indicated by the block 224, the last-used beacon, i.e., synchronization signal, is selected to be, at least initially, a "most preferred" carrier.

Then, and as indicated by the decision block 226, a determination is made as to whether the synchronization signal, i.e., the burst of the HPS signal, is acquired. If so, the yes branch is taken to the decision block 228 whereat a determination is made as to whether service pursuant to the terrestrial cellular communication network is preferred. If so, the yes branch is taken to the decision block 232 whereat a determination is made as to the availability of these terrestrial cellular communication network. If the terrestrial cellular communication network is available, the yes branch is taken to the block 234, and the radiotelephone 12 remains operable to communicate pursuant to the terrestrial cellular communication network.

If, however, a determination is made at the decision block 226 that the HPS signal burst has not been acquired, the no branch is taken to the decision block 236 whereat a determination is made as to whether the terrestrial cellular communication network is available. Such availability is determined by detection at the radiotelephone of downlink control signals generated by the network portion of the terrestrial cellular communication system. If access to the terrestrial cellular communication network is available, the yes branch is taken to the block 238 and synchronization-signal, i.e., beacon signal, information is retrieved from the terrestrial cellular communication network. And, the receiver circuitry 24 of the radiotelephone 12 is tuned to the most-preferred carrier indicated in the information provided by the terrestrial cellular communication network.

Then, and as indicated by the decision block 242, a determination is made as to whether communication pursuant to the terrestrial cellular communication system is preferred. If so, the yes branch is taken to the block 234.

Otherwise, the no branch is taken to the block 244 and an attempt is made to acquire (i.e., detect and then synchronize to, the synchronization signal generated by the satellite communication system). Also, if the cellular communication system is determined not to be available at the decision block 232, the no branch is taken also to the block 244.

A determination is made, as indicated by the decision block 246, as to whether the HPS signal burst has been acquired. If so, the yes branch is taken to the block 248 and sleep mode procedures are started. Otherwise, i.e., if the HPS signal burst has not been acquired, the no branch is taken to the block 252 and the fast search procedure is entered. Then, and as indicated by the decision block 254, a determination is made as to whether the HPS signal burst has been acquired.

If so, the yes branch is taken, also to the block 248. Otherwise, the no branch is taken to the block 256, and a standard search procedure to synchronize the radiotelephone to the decision block 258. At the decision block 258, a determination is again made as to whether the HPS signal burst has been acquired. If so, the yes branch is taken to the block 248. Otherwise, if the synchronization signal cannot be acquired, the no branch is taken to the block 262, and radiotelephone power is turned-off.

FIG. 5 illustrates a logical flow diagram listing the method steps of the method, shown generally at 272, of an embodiment of the present invention. The method 272 is operable to facilitate the detection of a synchronization signal generated by a satellite communication network by a multi-mode radio transceiver. The radio transceiver has receiver circuitry and transmitter circuitry permitting communication at least alternately with the terrestrial cellular communication network and the satellite communication network.

First, and as indicated by the block 274, downlink control signals generated by the terrestrial cellular network are detected. Then, and as indicated by the block 276, satellite-network, synchronization signal-location information is extracted from downlink information signals generated by the terrestrial cellular network.

Then, and as indicated by the block 278, the satellite synchronization signal is detected. Thereafter, and as indicated by the block 288, the radiotelephone is synchronized to the synchronization signal.

Thereby, an embodiment of the present invention advantageously facilitates the early detection of a synchronization signal generated by a satellite communication system. Advantage is made of the ability of the multi-mode radiotelephone to communicate also pursuant to a terrestrial cellular communication system. The time required of a radiotelephone to acquire synchronization with a synchronization signal generated by a satellite communication system is reduced.

The previous descriptions are of preferred examples for implementing the invention, and the scope of the invention should not necessarily be limited by this description. The scope of the present invention is defined by the following claims.

What is claimed is:

1. In a multi-mode radio transceiver having receiver circuitry and transmitter circuitry permitting communication by way of the radio transceiver at least alternately with a first cellular communication network and with a second communication network, a combination with the receiver circuitry of apparatus for facilitating detection of a synchronization signal generated by the second communication network, the synchronization signal for synchronizing the radio transceiver with the second network, said apparatus comprising:

a first-network cellular signal detector coupled to the receiver circuitry, said first-network cellular signal detector for detecting downlink control signals generated by the first cellular network;

an information extractor coupled to the receiver circuitry and operable responsive to detection by said detector of the downlink control signals, said information extractor for extracting second-network, synchronization signal-location information from downlink informational signals generated by the first cellular network; and a second-network synchronization signal detector coupled to the receiver circuitry and operable responsive to the second-network, synchronization signal-location information extracted by said information extractor, said second-network synchronization signal detector for detecting the synchronization signal generated by the second communication network.

2. The apparatus of claim 1 wherein said first-network cellular signal detector is operable to cause the receiver circuitry to tune to at least one control channel associated with the first cellular network and, once tuned thereto, to detect transmission thereon of the downlink control signals.

3. The apparatus of claim 1 further comprising an information requestor coupled to the transmitter circuitry, said information requestor for generating an information request signal for transmission by the transmitter circuitry to the first cellular network, the information request for requesting generation by the first cellular network of the downlink informational signals.

4. The apparatus of claim 1 wherein the first cellular network is further operable to provide SMS (short message service), wherein the downlink informational signals comprise SMS signals, and wherein said information extractor extracts the second-network, synchronization signal-location information from the SMS signals.

5. The apparatus of claim 1 wherein the first cellular network is further coupled by way of a packet-switched connection to a second-network, synchronization signal-location information source, wherein the downlink informational signals comprise packetized data signals, and wherein said information extractor extracts the second-network, synchronization signal-location information from the packetized data signals.

6. The apparatus of claim 5 wherein the packet-switched connection comprises an Internet connection.

7. The apparatus of claim 1 wherein the second-network, synchronization signal-location information extracted by said information extractor comprise indications of at least one carrier upon which the synchronization signal is broadcast by the second communication network.

8. The apparatus of claim 7 wherein said second-network synchronization signal detector is operable to cause the receiver circuitry to tune to the at least one carrier upon which the synchronization signal is broadcast.

9. The apparatus of claim 8 wherein the second communication network comprises an ASEAN cellular satellite network, wherein the synchronization signal broadcast by the second communication network comprises an HPS (high power synchronization) signal, and wherein said second-network synchronization signal detector detects the HPS signal, once tuned to the carrier upon which the synchronization signal is broadcast.

10. The apparatus of claim 1 wherein said second-network synchronization signal detector measures signal energy levels during selected time periods of the at least one carrier to, which said second-network synchronization signal causes the receiver circuitry to be tuned.

11. The apparatus of claim 1 wherein the first cellular communication network comprises a terrestrial cellular communication network, wherein the second communication network comprises a satellite communication network, wherein said first-network cellular signal detector comprises a terrestrial cellular signal detector, and wherein said second-network synchronization signal detector comprises a satellite synchronization signal detector.

12. A method for facilitating detection of a synchronization signal generated by a satellite communication network at a multi-mode radio transceiver having receiver circuitry and transmitter circuitry permitting communication at least alternately with a terrestrial cellular communication network and the satellite communication network, said method comprising the steps of:

detecting downlink control signals generated by the terrestrial cellular network;

extracting, responsive to detection of the downlink control signals, of satellite-network, synchronization signal-location information from downlink informational signals generated by the terrestrial cellular network; and detecting, responsive to the satellite-network, synchronization signal-location information extracted during said step of extracting, the satellite synchronization signal.

13. The method of claim 12 comprising the further step of synchronizing the multi-mode radio transceiver with the satellite synchronization signal detected during said step of detecting the satellite synchronization signal.

14. The method of claim 12 wherein said step of detecting the downlink control signals comprises tuning the receiver circuitry to at least one control channel associated with the terrestrial cellular network.

15. The method of claim 12 comprising the further intermediary step, subsequent to said step of detecting the downlink control signals, of requesting generation by the terrestrial cellular network of the downlink information signals.

16. The method of claim 12 wherein the terrestrial cellular network is further operable to provide SMS (short message service), and wherein said step of extracting comprises extracting the satellite-network, synchronization signal-location information from the SMS signals.

17. The method of claim 12 wherein the terrestrial cellular network is further coupled by way of a packet-switched connection to a satellite-network, synchronization signal-location information source, wherein the downlink informational signals from which the satellite-network, synchronization signal-location information is extracted during said step of extracting comprise packetized data signals, and wherein said step of extracting comprises the satellite-network, synchronization signal-location information from the packetized data signals.

18. The method of claim 12 wherein the satellite-network, synchronization signal-location information extracted during said step of extracting comprise indications of at least one carrier upon which the synchronization signal is broadcast by the satellite communication network.

19. The method of claim 18 wherein said step of detecting the satellite synchronization signal comprises tuning the receiver circuitry to the at least one carrier upon which the synchronization signal is broadcast.

20. The method of claim 19 wherein the satellite communication network comprises an ASEAN cellular satellite network, wherein the synchronization signal broadcast by the satellite communication network comprises an HPS (high power synchronization) signal, and wherein said step of detecting the satellite synchronization signal comprises detecting the HPS signal subsequent to tuning the receiver circuitry during said step of tuning to the carrier upon which the synchronization signal is broadcast.

* * * * *